(12) United States Patent
Tan

(10) Patent No.: US 6,920,121 B2
(45) Date of Patent: Jul. 19, 2005

(54) QUALITY PACKET RADIO SERVICE FOR A GENERAL PACKET RADIO SYSTEM

(75) Inventor: Harry Tan, Rolling Hills Estates, CA (US)

(73) Assignee: QPRS Limited (VG)

( * ) Notice: Subject to any disclaimer, the term of this patent is extended or adjusted under 35 U.S.C. 154(b) by 30 days.

(21) Appl. No.: 10/390,144

(22) Filed: Mar. 17, 2003

(65) Prior Publication Data

US 2004/0184426 A1 Sep. 23, 2004

(51) Int. Cl.[7] ............................................. H04Q 7/28
(52) U.S. Cl. .................. 370/329; 370/341; 370/437; 455/450
(58) Field of Search ................ 370/328, 329, 370/340, 341, 437, 465, 330, 433; 455/450–453, 455, 464, 509, 516

(56) References Cited

U.S. PATENT DOCUMENTS

| | | | |
|---|---|---|---|
| 6,532,225 B1 * | 3/2003 | Chang et al. | 370/341 |
| 6,701,151 B2 * | 3/2004 | Diachina et al. | 455/452.1 |
| 6,707,808 B1 * | 3/2004 | Vedrine | 370/337 |
| 2002/0082033 A1 * | 6/2002 | Lohtia et al. | 455/517 |
| 2002/0105940 A1 * | 8/2002 | Forssell et al. | 370/349 |
| 2002/0141359 A1 * | 10/2002 | Jei | 370/329 |
| 2003/0002457 A1 * | 1/2003 | Womack et al. | 370/329 |
| 2004/0090948 A1 * | 5/2004 | Forssell et al. | 370/349 |

* cited by examiner

Primary Examiner—Ricky Ngo
Assistant Examiner—Duc Duong
(74) Attorney, Agent, or Firm—Patton Boggs LLP

(57) ABSTRACT

The Quality Packet Radio Service enhances the slow General Packet Radio Service medium access procedure to include fast in-session access capability. In order to maximize spectral efficiency, all services in Quality Packet Radio Service are assigned uplink radio channel resources only when they have active data to send. A new set of common control channels is designed to provide these in-session network access capabilities. These channels support similar access and control functions as the General Packet Radio Service common control channels (such as Packet Random Access Channel, Packet Access Grant Channel) except they are used solely in Quality Packet Radio Service to implement in-session access. These common control channels are structured to meet the stringent low delay requirements for in-session access and are termed fast packet common control channels. Since initial radio channel access to the mobile subscriber station has already been established, a smaller amount of overhead information is required for implementing in-session access, thereby allowing these stringent low delay requirements to be met. Specifically, for those services allowed to use in-session access, the assigned uplink channel resources are released during an in-session inactive data period by releasing its assigned Uplink State Flag(s) and Packet Data Traffic Channel(s).

26 Claims, 11 Drawing Sheets

QUALITY PACKET RADIO SERVICE FOR A GENERAL PACKET RADIO SYSTEM

FIELD OF THE INVENTION

This invention relates to advanced cellular communication networks and, in particular, to a system that improves the performance of existing cellular communication networks by enhancing the slow General Packet Radio Service medium access procedure to include fast in-session access capability.

PROBLEM

It is a problem in legacy cellular communication networks to provide subscribers with data services, such as the Internet, and access to packet-switched data communications. This is due to the fact that legacy cellular communication networks have a circuit-switched architecture designed primarily for voice services, where the network topology is point-to-point in nature. This paradigm represents the historical view of cellular communications as a wireless equivalent of traditional wire-line telephone communication networks, which serve to interconnect a calling party with a called party. An additional problem in cellular communication networks is that the need to concurrently serve many voice subscribers with the limited bandwidth available in cellular communication networks has prevented the provision of wide bandwidth communication services, such as data, to these subscribers.

The Internet has emerged as the major driving force behind the development of new communication network technology. There has also been a worldwide explosion in the number of wireless cellular subscribers that generates an ever-increasing demand for both ubiquitous untethered communications and constant service availability. The convergence of these two powerful trends has fostered an exponential growth in the demand for mobile access to Internet applications. However, Internet and other data services require the use of packet-switched data networks to obtain the required performance. The legacy first generation (1G) and second generation (2G) cellular communication networks have a circuit-switched architecture designed primarily for voice services. This has fostered the development of packet-switched network overlays, termed 2.5G networks, which are implemented over existing second generation (2G) cellular communication networks. The 2.5G networks form an interim solution for providing packet-switched data services to existing second generation (2G) cellular communication networks until the full scale development and deployment of third generation (3G) cellular communication networks that provide both circuit-switched voice as well as packet-switched data services. Moreover, the 2.5G networks will thereby provide a legacy platform upon which cost-effective third generation (3G) cellular communication network upgrades can be implemented and deployed.

However, a problem with the General Packet Radio Service packet-switched network overlay is that it is designed primarily for providing only best effort service to bursty data traffic in a spectrally efficient manner. It is extremely well designed for providing this type of service and keeping the necessary level of compatibility and interoperability with GSM. However, 2.5G systems such as General Packet Radio Service are expected to eventually migrate in a graceful and cost-effective manner to full 3G network deployment. Therefore it is extremely desirable for enhancements of these systems to incorporate higher levels of 3G functionality. One of the main attributes of 3G is to enable new service applications. These new service applications are supported through the definition of supported 3G service classes with varying degrees of quality of service (QoS) requirements, including some with much more stringent delay requirements than the best effort service class. The ETSI UMTS Phase 2+ General Packet Radio Service recommendations include the following service classes:

Conversation Class—Preserves conversation pattern with stringent low delay and low error rate requirements. Example: voice service Streaming Class—Preserves time relation between information elements of the stream. Example: streaming audio, video Interactive Class—Preserves request response data transfer pattern and data payload content. Example: web browsing Background Class—Preserves data payload content and best effort service requirement. Example: Background download of email messages The conversational class has the most stringent low delay requirements followed by the streaming class and the interactive class. The background class is essentially delay-insensitive. Presently, the General Packet Radio Service system only supports the Background Class and does not have the functionality to migrate to serve the additional classes of service.

SOLUTION

The above-described problems are solved and a technical advance achieved by the present Quality Packet Radio Service which provides enhancements to the Radio Link Control/Medium Access Control (RLC/MAC) layer protocol of General Packet Radio Service packet-switched network overlay, implemented over existing second generation (2G) cellular communication networks, to support additional classes of service.

It is desirable to enhance the current General Packet Radio Service to be able to support the additional stringent delay requirements of the additional service classes to thereby arrive at a single IP-based integrated network capable of providing all classes of service from conversational to best effort data. To be spectrally efficient for all of these service classes, it is necessary to be able to efficiently multiplex several data sessions with different QoS delay requirements on the same set of channels. The Quality Packet Radio Service accomplishes this by enhancing the slow General Packet Radio Service medium access procedure to include fast in-session access capability. In order to maximize spectral efficiency, all services in Quality Packet Radio Service are assigned uplink radio channel resources only when they have active data to send. A new set of common control channels is designed to provide these in-session network access capabilities. These channels support similar access and control functions as the General Packet Radio Service common control channels (such as Packet Random Access Channel, Packet Access Grant Channel) except they are used solely in Quality Packet Radio Service to implement in-session access. These common control channels are structured to meet the stringent low delay requirements for in-session access and are termed fast packet common control channels. Since initial radio channel access to the mobile subscriber station has already been established, a smaller amount of overhead information is required for implementing in-session access, thereby allowing these stringent low delay requirements to be met.

Specifically, for those services allowed to use in-session access, the assigned uplink channel resources are released during an in-session inactive data period by releasing its assigned Uplink State Flag(s) and Packet Data Traffic Channel(s). However the mobile subscriber station is allowed to maintain its uplink Temporary Flow Identifier. Thus, the mobile subscriber station can inform the Base Station Subsystem of its identity and the specific Temporary Back Flow being referenced by including the Temporary Flow Identifier in its in-session channel request message. The Base Station Subsystem can very quickly identify the mobile subscriber station and the session referenced and assign necessary uplink resources.

Thus, the Quality Packet Radio Service only requires software modifications and preserves completely the existing network infrastructure and appliance hardware, since it is implemented in the Medium Access Control layer of the General Packet Radio Service.

DETAILED DESCRIPTION OF THE DRAWINGS

In this description, the phrase "third generation cellular communication network" is used to characterize a network that provides a full complement of packet-based services to mobile subscriber stations. The technical description of the invention is based on the existing General Packet Radio Service packet network overlay on second generation circuit switched cellular communication networks but it is not intended to limit the application of the Quality Packet Radio Service to this environment, this architecture is simply used to illustrate the concepts of the Quality Packet Radio Service.

Cellular Communication Network Philosophy

Figure 1A:
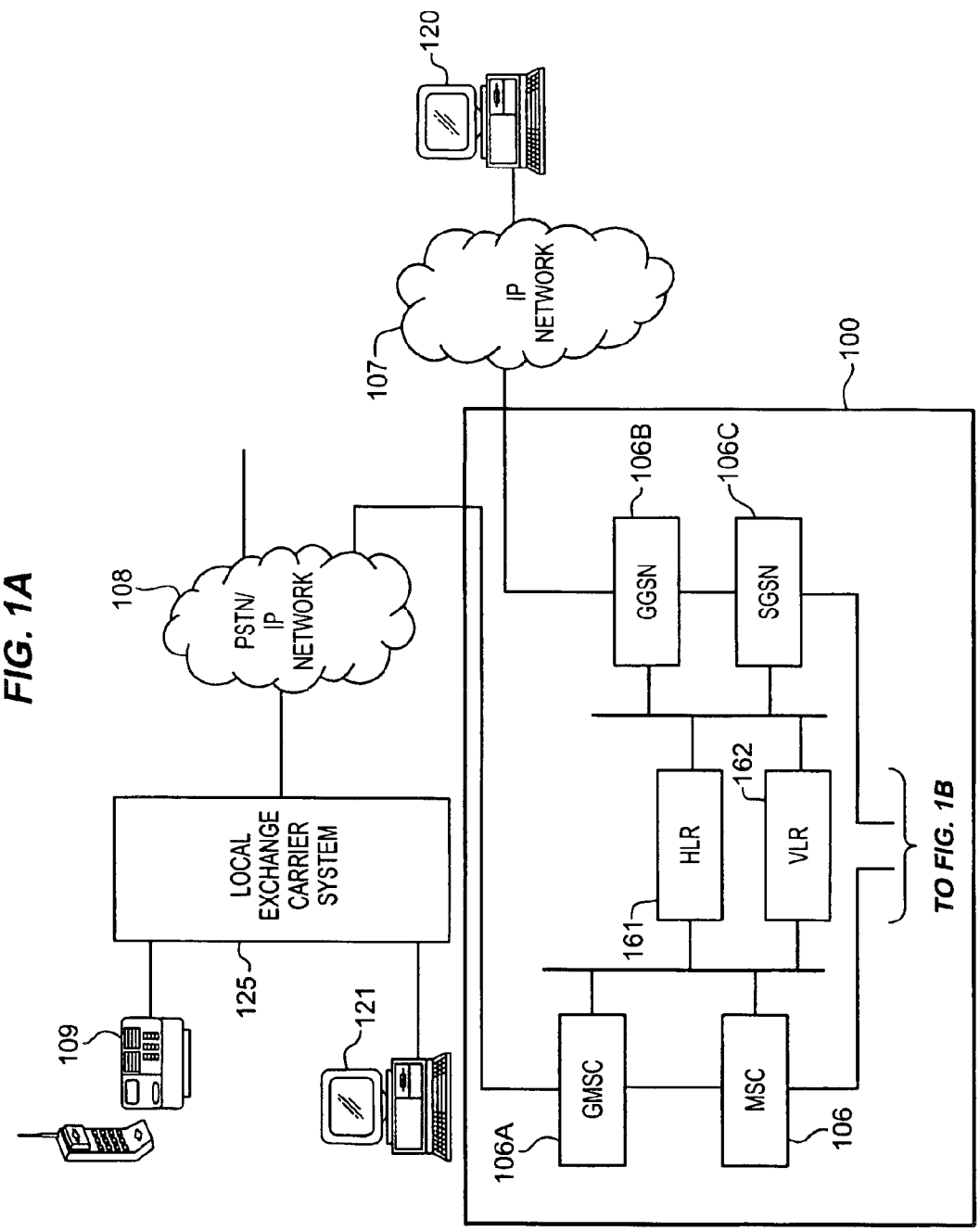
FIGS. 1A & 1B illustrate in block diagram for the overall architecture of a second generation (2G) cellular communication network that is equipped with the General Packet Radio Service packet-switched network overlay.
Figure 1B:
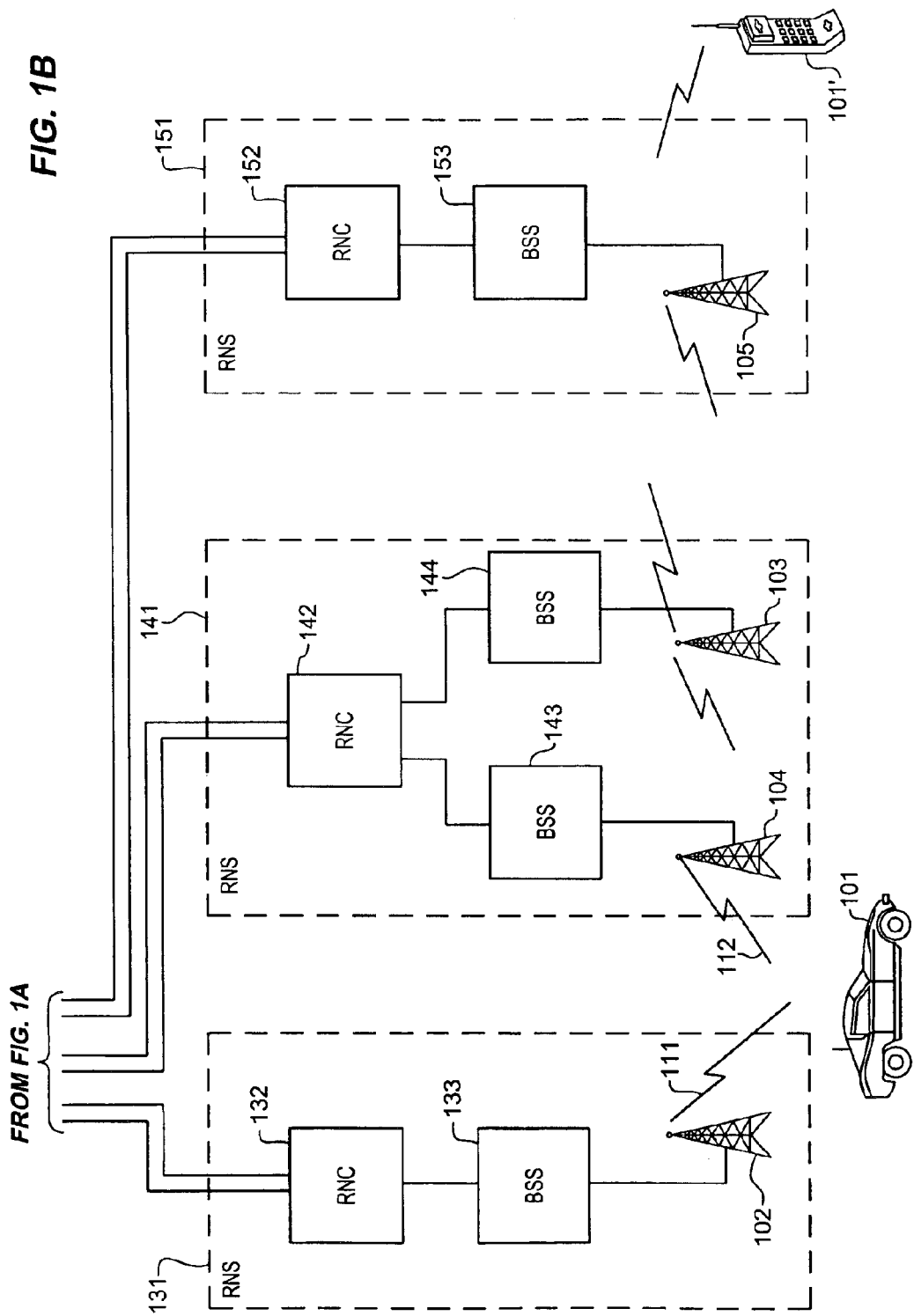

Cellular communication networks 100, as shown in block diagram form in FIGS. 1A & 1B, provide the service of connecting wireless telecommunication customers, each having a mobile subscriber station, to both land-based customers who are served by the common Carrier Public Switched Telephone Network (PSTN) 108 as well as other wireless telecommunication customers. In such a network, all incoming and outgoing calls are routed through Mobile Switching Centers (MSC) 106, each of which is connected to a plurality of Radio Network Subsystems (RNS) 131–151 which communicate with mobile subscriber stations 101, 101' located in the area covered by the cell sites. The mobile subscriber stations 101, 101' are served by the Radio Network Subsystems (RNS) 131–151, each of which is located in one cell area of a larger service region. Each cell site in the service region is connected by a group of communication links to the Mobile Switching Center 106. Each cell site contains a group of radio transmitters and receivers, termed a "Base Station" herein, with each transmitter-receiver pair being connected to one communication link. Each transmitter-receiver pair operates on a pair of radio frequencies to create a communication channel: one frequency to transmit radio signals to the mobile subscriber station and the other frequency to receive radio signals from the mobile subscriber station. The Mobile Switching Center 106, in conjunction with the Home Location Register (HLR) 161 and the Visitor Location Register (VLR) 162, manages subscriber registration, subscriber authentication, and the provision of wireless services such as voice mail, call forwarding, roaming validation and so on. The Mobile Switching Center 106 is connected to a Gateway Mobile Services Switching Center (GMSC) 106A as well as to the Radio Network Controllers, with the GMSC 106A serving to interconnect the MSC 106 with the PSTN/IP Network 108. In addition, the Radio Network Controllers are connected via Serving GPRS Support Node 106C through the Gateway GPRS Support Node GGSN 106B to the Internet. The Radio Network Controllers 132, 142, 152 at each cell site Radio Network Subsystem 131–151 control the transmitter-receiver pairs at the Radio Network Subsystem 131–151. The control processes at each Radio Network Subsystem also control the tuning of the mobile subscriber stations to the selected radio frequencies. In the case of WCDMA, the system also selects the PN code word to enhance isolation of the communications with the mobile subscriber stations.

In FIG. 1B, the mobile subscriber station 101 is simultaneously communicating with two Base Stations 133 & 143, thus constituting a soft handoff. However, a soft handoff is not limited to a maximum of two Base Stations. When in a soft handoff, the Base Stations serving a given call must act in concert so that commands issued over RF channels 111 and 112 are consistent with each other. In order to accomplish this consistency, one of the serving Base Stations may operate as the primary Base Station with respect to the other serving Base Stations. Of course, a mobile subscriber station 101 may communicate with only a single Base Station if this is determined to be sufficient by the cellular communication network.

The control channels that are available in this system are used to set up the communication connections between the subscriber stations 101 and the Base Station 133. When a call is initiated, the control channel is used to communicate between the mobile subscriber station 101 involved in the call and the local serving Base Station 133. The control messages locate and identify the mobile subscriber station 101, determine the dialed number, and identify an available voice/data communication channel consisting of a pair of radio frequencies (and orthogonal coding for CDMA systems) which is selected by the Base Station 133 for the communication connection. The radio unit in the mobile subscriber station 101 re-tunes the transmitter-receiver equipment contained therein to use these designated radio frequencies and orthogonal coding. Once the communication connection is established, the control messages are typically transmitted to adjust transmitter power and/or to change the transmission channel when required to handoff this mobile subscriber station 101 to an adjacent cell, when the subscriber moves from the present cell to one of the adjoining cells. The transmitter power of the mobile subscriber station 101 is regulated since the magnitude of the signal received at the Base Station 133 is a function of the subscriber station transmitter power and the distance from the Base Station 133. Therefore, by scaling the transmitter power to correspond to the distance from the Base Station 133, the received signal magnitude can be maintained within a predetermined range of values to ensure accurate signal reception without interfering with other transmissions in the cell.

The voice communications between mobile subscriber station 101 and other subscriber stations, such as land line based subscriber station 109, is effected by routing the communications received from the mobile subscriber station 101 through the Telephone Switching Center 106 and trunks to the Public Switched Telephone Network (PSTN) 108 where the communications are routed to a Local Exchange Carrier 125 that serves land line based subscriber station 109. There are numerous Mobile Switching Centers 106 that are connected to the Public Switched Telephone Network (PSTN) 108 to thereby enable subscribers at both land line based subscriber stations and mobile subscriber stations to communicate between selected stations thereof. Data communications between mobile subscriber station 101 and other data communication systems, such as server 120, is effected by routing the data communications received from the mobile subscriber station 101 through IP network 107. This architecture represents the present architecture of the wireless and wire-line communication networks.

General Packet Radio Service

General Packet Radio Service (GPRS), as shown in FIG. 1A, is a packet network overlay that can be deployed to provide a 2.5G packet switched upgrade of the TDMA-based second generation (2G) circuit switched cellular communication networks: Global System for Mobile Communications (GSM), and the North American IS-136. The implementation of the Quality Packet Radio Service in the General Packet Radio Service packet network overlay on GSM cellular communication networks is described herein, in view of its present dominant position in serving over 70 percent of worldwide cellular subscribers. The extension of the General Packet Radio Service to the North American IS-136 cellular communication network is analogous to the implementation disclosed herein and the description of this implementation is omitted in the interest of brevity.

The General Packet Radio Service overlay over the circuit-switched GSM cellular communication network provides an independent IP-based packet-switched core network. The present evolution of General Packet Radio Service is designed primarily for providing best-effort packet services and permits IP-based applications such as Internet access in an efficient manner. However, a problem with the General Packet Radio Service packet-switched network overlay is that it is designed primarily for providing only best effort service to bursty data traffic in a spectrally efficient manner.

The focus of the present Quality Packet Radio Service is to develop enhancements to the Radio Link Control/Medium Access Control (RLC/MAC) layer protocol of General Packet Radio Service to enable the provision of all the other traffic classes—Class 1 through Class 4 as specified by ETSI (European Telecommunications Standards Institute) UMTS (Universal Mobile Telephone System) Phase 2+ General Packet Radio Service recommendations— that will be supported by future 3G systems. These classes are:

| | |
|---|---|
| Conversational | Voice, video telephony (very low latency) |
| Streaming | Multimedia (preserve internal time relationship) |
| Interactive | Web browsing, games (preserve data integrity) |
| Background | E-mail (time insensitive, preserve data integrity) |

These are termed Quality of Service (QoS) and the frame error rates can vary from a 10% frame error rate to $10^{-6}$ bit error rate. For CDMA systems, the lower the bit error rate, the higher the spreading sequence meaning more transmit power and bandwidth are used with a corresponding higher Quality of Service. From the mobile subscriber station's perspective, the Quality of Service and occupied base-band data rate affect the final encoded data rate on a frame-by-frame basis, the call appears, in its functionality, to be circuit switched and continuous in nature. This is particularly true when in soft or softer handoff.

These Quality Packet Radio Service enhancements are made in the MAC/RLC layer of the General Packet Radio Service protocol stack only. Hence only software upgrades of the Mobile Station (101) and the Base Station Subsystem (BSS) are necessary and no hardware modifications are required. The GSM physical layer, TDMA time slot and framing structures are preserved, thereby allowing legacy GSM handsets to continue to function in a Quality Packet Radio Service overlay of GSM. Finally, the Quality Packet Radio Service core network is compatible with the proposed EDGE (Enhanced Data for GSM Evolution) upgrade to 8-PSK modulation as well as UMTS W-CDMA for a clear migration path to eventual 3G systems.

The Quality Packet Radio Service only requires software modifications and preserves completely existing network infrastructure and appliance hardware since it is primarily related to the medium access control layer. Therefore, the following description is focused on the corresponding General Packet Radio Service RLC/MAC protocol layer.

General Packet Radio Service Network Architecture

In order to understand the operation of the Quality Packet Radio Service, the underlying architecture of the General Packet Radio Service is described. The following description relates to the portion of the General Packet Radio Service that implements the Radio Link Control/Medium Access Control (RLC/MAC) protocol layer.

The General Packet Radio Service network architecture, since it was originally designed to overlay GSM networks, is heavily based on GSM system concepts to achieve the maximum amount of interoperability and to require the least amount of additional infrastructure and modifications for implementing the overlay. The General Packet Radio Service enabled mobile subscriber stations (MS) communicate directly across the same GSM physical radio links with the GSM base station transceivers located in the cell sites. In the GSM Public Land Mobile Network (PLMN), base station controllers (BSC) control the radio links between the mobile subscriber station and the Base Station Transceiver, and a Base Station Transceiver and its associated BSC is called a Base Station Subsystem (BSS). The base station controllers are connected to the GSM Public Land Mobile Network backbone through mobile switching centers (MSC), which provide the switching, routing and transfer of intra-GSM Public Land Mobile Network voice, message and control signals. The gateway mobile switching center (GMSC) is the interface of the GSM Public Land Mobile Network to the public switched telephone network (PSTN). Communications between network elements in a GSM Public Land Mobile Network employ Signaling No. 7 (SSN7).

The General Packet Radio Service overlay adds two new network router elements: the Serving General Packet Radio Service Support Node (SGSN) and the Gateway General Packet Radio Service Support Node (GGSN). Hardware upgrades of the Base Station Subsystem are also required. A Channel Codec Unit (CCU) is incorporated into an existing Base Station Transceiver to enable General Packet Radio Service specific coding schemes. The Base Station Subsystems are connected to their serving GPRS Support Node. A Packet Control Unit Support Node (PCUSN) unit is added to each Base Station Subsystem to support the frame relay packet data interface between the Base Station Subsystem and the GPRS Support Node. The GPRS Support Nodes serve as the access routers to the General Packet Radio Service core network. The GGSN is the gateway router that interfaces the General Packet Radio Service core network to external IP or X.25/X.75 packet data networks (PDN). Circuit switched traffic destined to the PSTN continue to be routed from the Base Station Subsystem to the MSC and then through the GMSC on to the PSTN. On the other hand, packet switched traffic is independently routed from the Base Station Subsystem through its serving GPRS Support Node over the core General Packet Radio Service network to the GGSN, and on to Public Packet Data Networks.

The GSM physical layer is utilized in General Packet Radio Service where 200 KHz bandwidth channels are provided at different carrier frequencies in each cell site. Each 200 KHz channel is further channelized via time division multiplexing into 8 time slots per TDMA (time-division multiple access) frame. Each slot time is 0.577 msec in duration and each TDMA frame is 4.615 msec in duration. The General Packet Radio Service TDMA time slot and frame structure is displayed in FIGS. 2–4. Transmissions between different mobile subscriber stations and a Base Station Transceiver can occur within the 8 time slots. A mobile subscriber station transmits only in certain time slots and its transmitter is powered off when it is idle to conserve battery power. The mobile subscriber station's periodic switching of its transmitter on or off is called bursting and the transmission during a single time slot is called a burst. The normal burst of 156.25 bits duration that carries either user traffic or network control signaling is constructed as follows:

| Bit | Content |
| --- | --- |
| 1–3 | Tail bits (T) |
| 4–60 | Coded data (DATA) |
| 61 | Stealing flag bit (F) |
| 62–87 | Training sequence (TRAIN) |
| 88 | Stealing flag bit (F) |
| 89–145 | Coded data (DATA) |
| 146–148 | Tail bits (T) |
| 148–156.25 | Guard period (no transmission) (GUARD) |

Figure 3:
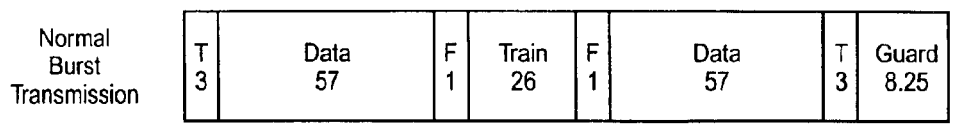

FIG. 3 displays the detailed structure of the normal burst transmission. The tail bits (T3) and the guard period (GUARD) are guard times used to compensate for timing jitter and synchronization errors. The stealing flag bits (F1) indicate whether the burst contains user traffic or network control signaling data and the training sequence allows the receiver to equalize radio propagation multi-path effects. There are only a total of 114 coded data bits in a normal burst transmission of 156.25 bit duration. Only these coded data bits carry user traffic or network control signaling data. The amount of coding depends on the level of channel error correction coding selected by the application.

General Packet Radio Service Protocol Architecture

Figure 5:
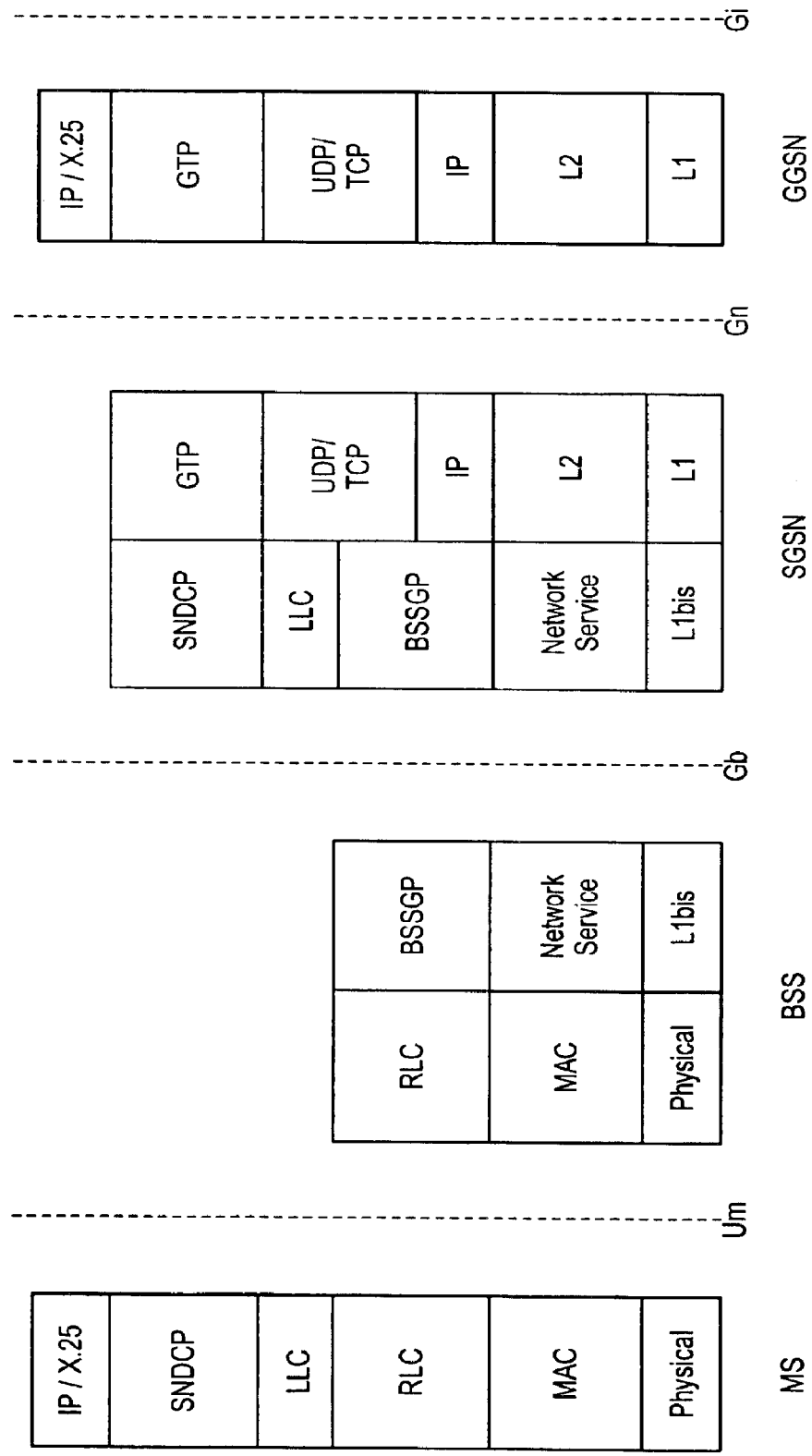
FIG. 5 illustrates the General Packet Radio Service protocol stack.

Although it supports applications based on IP and X0.25 (and potentially other packet data protocols), General Packet Radio Service specific protocols are employed within the General Packet Radio Service core network. FIG. 5 gives an illustration of the present version of the General Packet Radio Service protocol stack, the devices in which it is located and the interfaces between devices. In this structure, the following well-known elements are included:

| | |
| --- | --- |
| MS | Mobile Subscriber Station |
| BSS | Base Station Subsystem |
| SGSN | Serving General Packet Radio Service Support Node |
| GGSN | Gateway General Packet Radio Service Support Node |
| GTP | GPRS Tunnel Protocol |
| SNDCP | Sub-Network Dependent Convergence Protocol |
| BSSGP | Base Station GPRS Protocol |
| LLC | Logical Link Channel |
| RLC | Radio Link Control |
| MAC | Medium Access Channel |
| Gb | Interface between a SGSN and a Base Station Subsystem |
| Um | Interface between a mobile subscriber station and a GPRS fixed network part for providing packet network services |
| Gn | Interface between a SGSN and a GGSN |
| Gi | Interface between the GPRS network and other IP or X.25 networks |

The General Packet Radio Service Tunnel Protocol (GTP) is used to transfer packets between two General Packet Radio Service support nodes (e.g. SGSN, GGSN). The Tunnel Protocol encapsulates the IP or X.25 packet into a GTP Packet Data Unit (PDU). The GTP Packet Data Unit is routed over the IP-based General Packet Radio Service backbone network using either Transmission Control Protocol (TCP) for X.25-based applications or User Data Protocol (UDP) for IP-based applications. This process is called General Packet Radio Service tunneling. In transferring IP or X.25 packets between the mobile subscriber station and its serving GPRS Support Node, General Packet Radio Service uses a different set of network protocols, namely, the Sub-Network Dependent Convergence Protocol (Sub-Network Dependent Convergence Protocol) and the Logical Link Control (LLC) layers. The Sub-Network Dependent Convergence Protocol is used to map network protocol layer characteristics onto the specific characteristics of the underlying network. The Logical Link Control provides a secure logical pipe between the GPRS Support Node and each mobile subscriber station and performs such tasks as ciphering, flow control and error control. The Logical Link Control is used by the Sub-Network Dependent Convergence Protocol to transfer network layer Packet Data Units between the mobile subscriber station and it's serving GPRS Support Node. The Logical Link Control Packet Data Units are transferred over the radio link using the services provided by the Radio Link Control/Medium Access Control (RLC/MAC) protocol layer. The RLC/MAC protocol layer exists both within the mobile subscriber station and the Base Station Subsystem. The transfer of Logical Link Control Packet Data Units between multiple mobile subscriber stations and the core General Packet Radio Service network uses a shared radio medium. The Radio Link Control layer is responsible for:

1. Segmentation and re-assembly of Logical Link Control Packet Data Units.
2. Providing the option of including a link level automatic repeat request (ARQ) procedure for recovery of uncorrectable data block transmission errors.

The MAC layer operates between the mobile subscriber stations and the Base Station Subsystem and is responsible for:

1. Signaling procedures concerning radio medium access control
2. Performing contention resolution between access attempts, arbitration between multiple service requests from different mobile subscriber stations and medium allocations in response to service requests.

The RLC/MAC layer performance determines to a large extent the multiplexing efficiency and access delay of General Packet Radio Service applications over the radio interface.

General Packet Radio Service Frame and Data Structures

General Packet Radio Service uses the same physical time slot and TDMA frame structure as GSM. The basic Packet Data Unit between the mobile subscriber station and the Base Station Subsystem is called a Radio Link Control block (also called RLC/MAC block). A Logical Link Control Packet Data Unit is segmented into an appropriate number of Radio Link Control blocks. Each Radio Link Control block is structured so that it can be channel coded and transmitted in an interleaved fashion over 4 time slots in 4 consecutive TDMA frames. Therefore, the logical channel resource assignment unit in the RLC/MAC layer is one Radio Link Control block and its transmission unit in the physical layer uses normal bursts over 4 time slots. As we noted above, there are 114 channel coded data bits transmitted in each normal burst. One Radio Link Control block transmits 4×114=456 coded data bits. The time to transmit 4 TDMA frames=4×4.615 msec=18.46 msec. However, in GSM a multi-frame structure consisting of 52 TDMA frames is utilized, where every $13^{th}$ frame is used for purposes other than data transmission (e.g. channel measurements). Therefore, only 48 out of the 52 frames are used for data transmission and the average time to transmit 4 TDMA data frames=(4×4.615)×(52/48) msec=20 msec. This results in a maximum data throughput rate over the radio interface of 456 coded bits every 20 msec=22.8 Kbps per channel (note here that the time guard, training sequence and control bit overheads in a normal burst are not considered here). The actual information throughput rate is much less if the Radio Link Control Radio Link Control header, MAC protocol overhead bits, other control bits and the channel coding error protection bits in each Radio Link Control block are accounted for. Four different channel coding schemes CS-1 to CS-4 are defined in the General Packet Radio Service standard with the following information throughput rates:

| Code | Code Rate | Throughput (Kbps) |
|------|-----------|-------------------|
| CS-1 | 1/2       | 8                 |
| CS-2 | 2/3       | 12                |
| CS-3 | 3/4       | 14.4              |
| CS-4 | 1         | 20                |

Since there is no channel coding in CS-4 (since code rate=1), this represents the maximum possible information throughput rate of 20 Kbps per channel. Procedures are however included in General Packet Radio Service to allow a mobile subscriber station to utilize several channels simultaneously, thereby increasing its information throughput rate. Up to 8 channels can be allocated to a single mobile subscriber station at one time.

Figure 2:
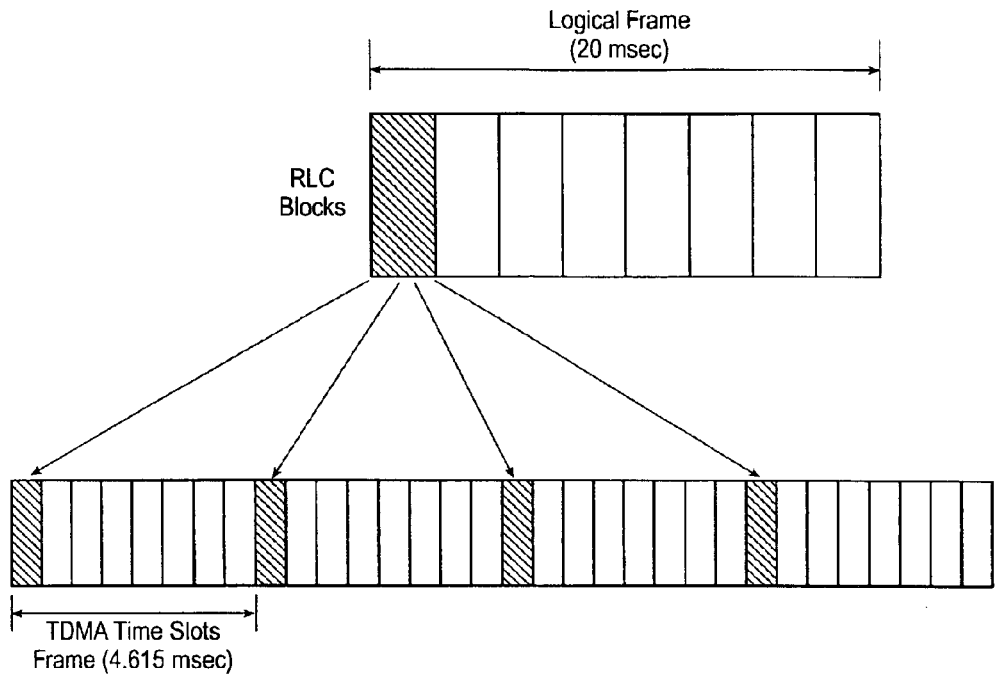
FIGS. 2–4 illustrate the General Packet Radio Service time slot and frame structure.

Each set of 4 TDMA frames containing 8 Radio Link Control blocks is called a logical frame. FIG. 2 illustrates the structure of a logical frame in terms of the underlying TDMA frames. Whereas there are 8 time slots in each TDMA frame, there are 32 time slots in each logical frame. Since the channel resource assignment unit in the RLC/MAC layer is a Radio Link Control block of normal bursts in 4 time slots, a channel supporting successive logical frames of these 4 time slots is referred to as a Packet Data Channel (PDCH). The Packet Data Channel may either be in the uplink (mobile subscriber station to Base Station Transceiver transmission) or downlink (Base Station Transceiver to mobile subscriber station transmission) directions. In General Packet Radio Service, the Packet Data Channel assignments are simplex channels, so that an Uplink (Uplink) Packet Data Channel can be used by one mobile subscriber station while the Downlink (Downlink) Packet Data Channel occupying the same time slots may be used by a different mobile subscriber station. The Packet Data Channels are mapped to various different logical channels that provide specific data transfer functions. To name a few that are useful for the following discussion, a Packet Data Channel that is used to transfer user data traffic only is called a Packet Data Traffic Channel (Packet Data Traffic Channel), which can be either an Uplink or Downlink channel. The Packet Access Grant Channel (PAGCH) is a Downlink channel used by the Base Station Transceiver to convey resource assignment messages to a mobile subscriber station. The Packet Associated Control Channel (PACCH), which can be either Uplink or Downlink, conveys network control signaling information and also can be used to convey resource assignment messages to a mobile subscriber station.

User mobility can place the mobile subscriber stations in a cell at different locations and distances from the Base Station Transceiver, resulting in different transmission propagation delays. So in GSM and General Packet Radio Service networks, precise timing synchronization must be acquired and maintained at the mobile subscriber station so that normal bursts in different time slots do not overlap. However, in some instances, such as before a radio link is established, timing synchronization does not exist and reliable normal burst transmissions may not be possible. To avoid this problem, the mobile subscriber station uses a shorter burst, called a random access burst, which allows the Base Station Transceiver to measure the propagation delay to the mobile subscriber station and subsequently control the mobile subscriber station timing by transmitting timing advance information to the mobile subscriber station. The random access burst is short enough so that no overlap with other bursts can occur for the largest possible propagation delay differences in a cell of 35 km radius (this is largest allowable cell size in GSM). The random access burst is therefore used by the mobile subscriber station to initiate network channel access requests when no timing information is available, and is constructed as follows:

| Bit       | Content                                |
|-----------|----------------------------------------|
| 1–8       | Tail bits (TAIL)                       |
| 9–49      | Synchronization sequence (SYNC)        |
| 50–85     | Coded data (DATA)                      |
| 86–88     | Tail bits (T)                          |
| 89–156.25 | Guard period (no transmission) (GUARD) |

Figure 4:
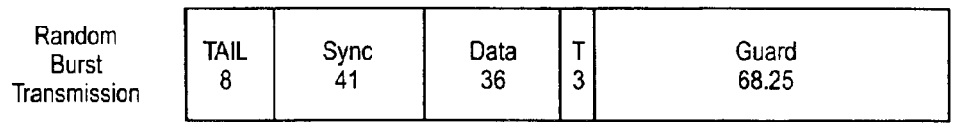

FIG. 4 displays the detailed structure of the random burst transmission. The guard period is sufficiently large to accommodate propagation delays caused by distances up to 75 km, thus allowing a 35 km cell radius. A long synchronization sequence is provided to allow for more accurate timing measurements. Considerable error protection is included so the 36 coded bits carry at most either 8 or 11 bits of information. A logical Uplink channel called the Packet Random Access Channel (PRACH) is assigned one TDMA time slot to be used by a mobile subscriber station to initiate network channel access and resource assignment requests. Normally, the Packet Random Access Channel is assigned one time slot per TDMA frame. There are four network channel access initiation opportunities in each logical frame. This is illustrated in FIG. 2, where time slot #1 in every TDMA frame is assigned to be a Packet Random Access Channel.

RLC/MAC Multiplexing

The RLC/MAC layer was designed to support best efforts transport service of bursty traffic in a spectrally efficient manner. Multiple data streams can be supported on the same Packet Data Traffic Channel and a given data stream can be supported using multiple Packet Data Traffic Channels. Data transfer in General Packet Radio Service is accomplished using an entity called a Temporary Back Flow (TBF). A Temporary Back Flow is a virtual connection that supports unidirectional transfer of Logical Link Control Packet Data Units on packet data physical channels between a mobile subscriber station and the Base Station Subsystem. This virtual connection is maintained for the duration of a data transfer and consists of a number of Radio Link Control blocks. A Temporary Back Flow can be either open-ended or closed-ended. A closed-ended Temporary Back Flow limits the data to be transferred to the amount negotiated between the mobile subscriber station and the Base Station Subsystem during initial network channel access. An arbitrary amount of data can be transferred in an open-ended Temporary Back Flow. Each Temporary Back Flow is identified by a Temporary Flow Identifier (TFI). A Temporary Flow Identifier is 7 bits long for the uplink and is 5 bits long for the downlink. The Temporary Flow Identifier assigned by the Base Station Subsystem is unique in each direction, so Radio Link Control blocks destined for different mobile subscriber stations are differentiated by their attached Temporary Flow Identifier embedded in the Radio Link Control block headers. After the completion of data transfer in a session, the Temporary Back Flow is terminated and its Temporary Flow Identifier is released.

Downlink multiplexing of multiple data streams on the same Packet Data Traffic Channel is accomplished by assigning each data transfer a unique Temporary Flow Identifier. Each mobile subscriber station listens to its set of assigned downlink Packet Data Traffic Channels and only accepts Radio Link Control blocks with its Temporary Flow Identifier. So a Base Station Subsystem can communicate with a mobile subscriber station on any of the Packet Data Traffic Channels assigned to it and can multiplex several Temporary Back Flows destined for different mobile subscriber stations on the same Packet Data Traffic Channel.

Figure 6:
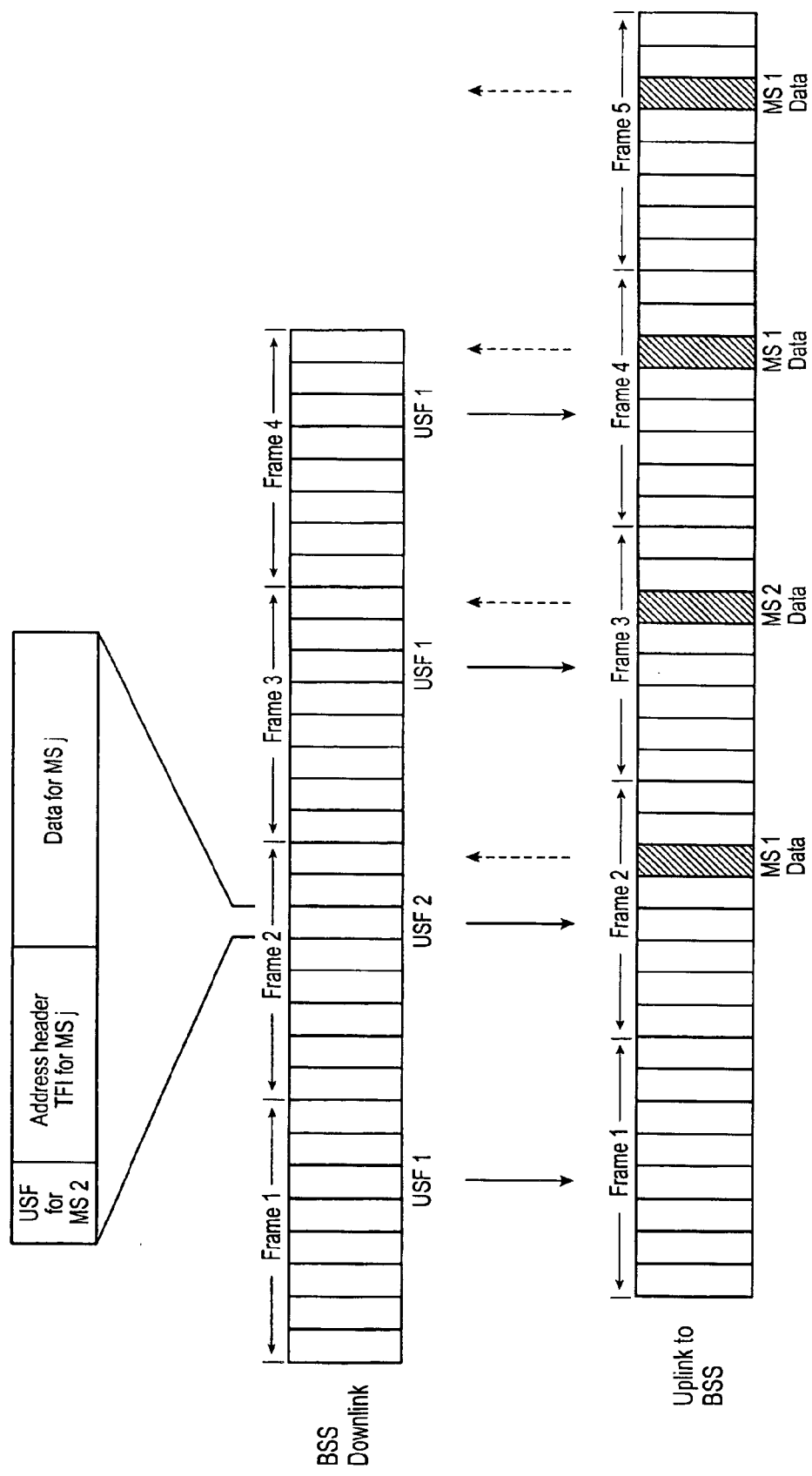
FIG. 6 illustrates the General Packet Radio Service uplink multiplexing.

Uplink multiplexing is accomplished by assigning to each data transfer a set of channels and a unique Uplink State Flag (USF) for each of these channels. The Uplink State Flag is 3 bits long, allowing up to 7 different data transfers to be multiplexed on one channel (the Uplink State Flag=111 is reserved by the network). The Base Station Subsystem uses a centralized in-band polling scheme to poll the desired mobile subscriber station. This is accomplished by setting the Uplink State Flag in the MAC header of the Radio Link Control block transmitted over the corresponding downlink channel to an appropriate value identifying the specific data transfer. Thus, a mobile subscriber station listens to all the downlink channels that are paired with the uplink channels assigned to it. If its Uplink State Flag appears on a downlink channel, then the mobile subscriber station uses the corresponding uplink channel in the next logical frame to send its data. The operation of this procedure is illustrated by the following example given in FIG. 6. In this example channel 6 of each uplink logical frame is assigned to both mobile subscriber station 1 and mobile subscriber station 2. So, after detecting its Uplink State Flag in channel 6 of downlink frame 1, mobile subscriber station 1 can use the corresponding uplink channel (channel 6 of the uplink logical frame) in frame 2. Meanwhile, the Uplink State Flag of mobile subscriber station 2 appears in channel 6 of downlink frame 2. So mobile subscriber station 2 now has permission to transmit on the corresponding uplink channel in frame 3. The Uplink State Flag of mobile subscriber station 1 appears next in both channel 6 of the downlink frames 3 and 4, thereby allowing mobile subscriber station 1 to transmit on the corresponding uplink channels in frames 4 and 5 respectively. The data carried by downlink channel 6 in each frame can be destined to any mobile subscriber station and its recipient is identified by the Temporary Flow Identifier header in the Radio Link Control data block. This process realizes the multiplexing of different users on the same uplink physical channel. So even though the downlink Radio Link Control data block may be destined to one mobile subscriber station, the Uplink State Flag carried in the MAC header of that block can be targeted to a different mobile subscriber station.

Medium Access Procedures

Figure 7:
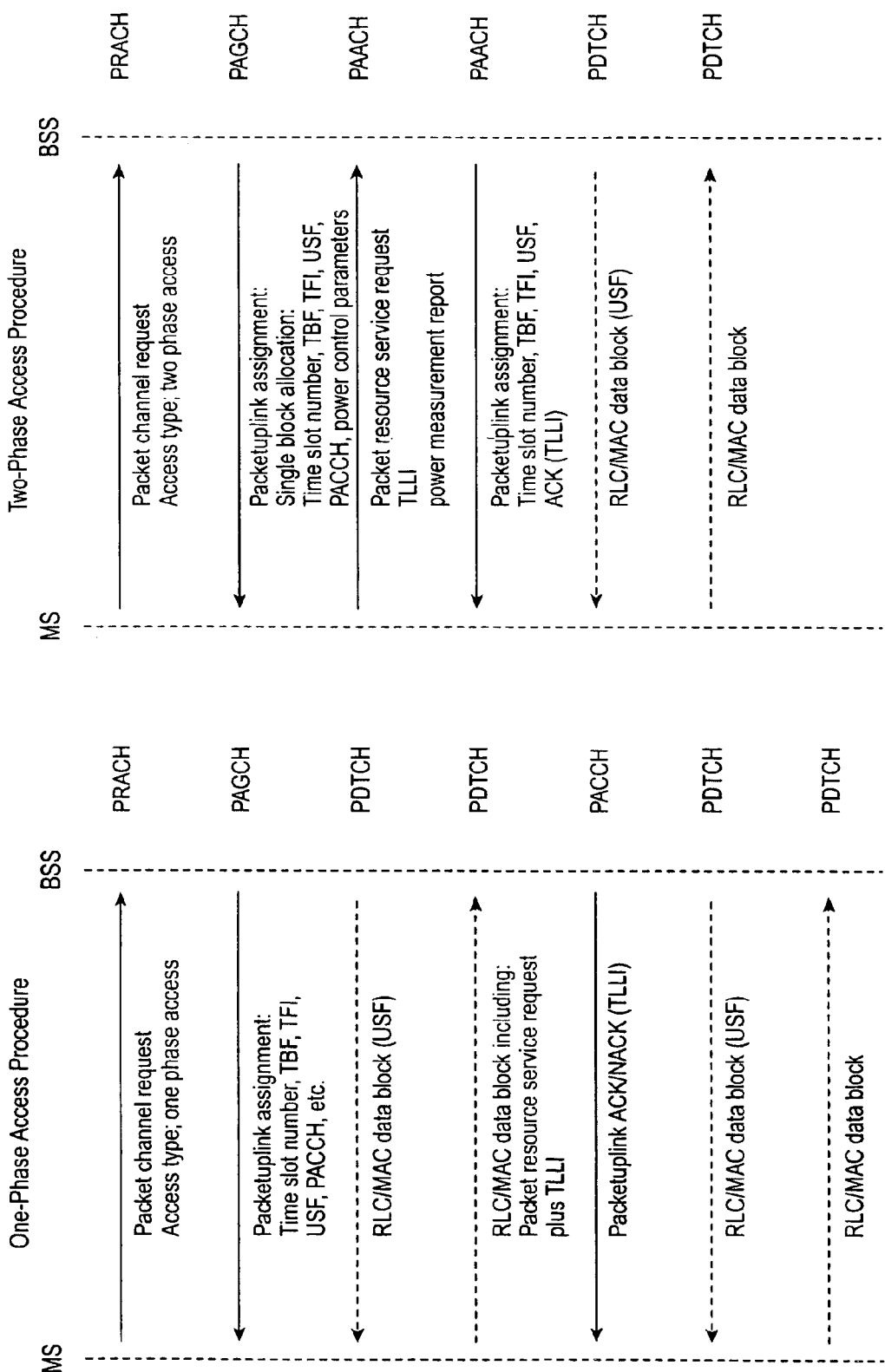
FIG. 7 illustrates the message flow for General Packet Radio Service access procedures.

General Packet Radio Service allows two types of access procedures for data transfer: one-phase or two-phase. Both of these procedures are shown in FIG. 7.

One-phase Procedure

The mobile subscriber station sends a packet channel request over a Packet Random Access Channel. As discussed earlier, this random access burst occupies only 1 TDMA time slot. General Packet Radio Service uses a slotted ALOHA based random access procedure for contention resolution over the Packet Random Access Channel. The 8 or 11 bit information field encrypted in the 36 coded data bits in the random access burst carries only a limited amount of information, namely; the reason for the access: whether it is a one-phase or two-phase access or a page response; the mobile subscriber station class and radio priority; and the number of blocks to be transmitted (for page responses only). The identity of the mobile subscriber station or the connection and the amount of data to be transmitted (except for page responses) is not included in this channel request and is not known by the network at this time.

After receiving the packet channel request, the Base Station Subsystem replies with a packet uplink assignment message over the Packet Access Grant Channel paired with the Packet Random Access Channel that was used. This message contains the resource assignment for the mobile subscriber station including the carrier frequency, Temporary Flow Identifier, Uplink State Flag and other parameters so the mobile subscriber station can transmit over the assigned uplink Packet Data Traffic Channel. However, at this time the network is not aware of the mobile subscriber station identity and the service requested.

The Base Station Subsystem sends the Uplink State Flag over the downlink Packet Data Traffic Channel in the next logical frame paired to the assigned uplink Packet Data Traffic Channel.

The mobile subscriber station hears its Uplink State Flag and begins data transfer over the assigned uplink Packet Data Traffic Channel in the next logical frame. The Radio Link Control block transmitted includes an extended header with the type of service requested and the mobile identity via its Temporary Logical Link Identifier (TLLI).

When the network decodes the Temporary Logical Link Identifier successfully, it sends an acknowledgement to the mobile subscriber station in an uplink ACK/NAK message over the Packet Associated Control Channel. Contention resolution is completed on the network side; and after the mobile subscriber station successfully receives this acknowledgement, contention resolution is completed also on the mobile subscriber station side.

Data transfer from the mobile subscriber station to the Base Station Subsystem can continue with the mobile subscriber station listening to its Uplink State Flag to begin data transfer over the assigned Packet Data Traffic Channel.

Two-phase Procedure

The mobile subscriber station sends a packet channel request in the same manner as in the one-phase procedure.

After receiving the packet channel request, the Base Station Subsystem replies with an uplink assignment message over the Packet Access Grant Channel. This assignment is a single block over an uplink Packet Associated Control Channel. This message contains the resource assignment for the mobile subscriber station including the carrier frequency, Temporary Flow Identifier, time slot and other parameters so the mobile subscriber station can transmit over the assigned Packet Associated Control Channel.

The mobile subscriber station sends a detailed packet resource request message over the assigned uplink Packet Associated Control Channel. This resource request includes the mobile Temporary Logical Link Identifier and the details of the service request.

In response to this request, the Base Station Subsystem then assigns the required resources to it using an uplink packet assignment message sent over the Packet Associated Control Channel. This message includes the carrier frequency, Temporary Flow Identifier and Uplink State Flag parameters so the mobile subscriber station can transmit over the assigned uplink Packet Data Traffic Channels.

The Base Station Subsystem sends the Uplink State Flag over the downlink Packet Data Traffic Channels in the next logical frame paired to the assigned uplink Packet Data Traffic Channels.

The mobile subscriber station hears its Uplink State Flag and begins data transfer over the assigned uplink Packet Data Traffic Channels in the next logical frame.

The choice of which of these two procedures to use is left to the General Packet Radio Service system operator. The essential difference is that in the one-phase procedure, the uplink data transfer begins concurrently with the service negotiation and mobile verification; whereas, in the two-phase procedure, the uplink data transfer only begins after the mobile verification and service negotiation is completed. Thus the one-phase procedure can be somewhat faster than the two-phase procedure if the requested service negotiation is acceptable by the network and the mobile subscriber station application (a minimum of 3 to 4 logical frame times for the one-phase procedure compared with 4 to 5 logical frame times for the two-phase procedure in the absence of contention). However, since mobile verification is not achieved prior to data transfer in the one-phase procedure, system operators consider it to be insecure, and favor the two-phase procedure in network deployments. Moreover, since the two-phase procedure is currently used in GSM systems, it is desirable for reasons of compatibility.

Quality Packet Radio Service—Enhancements to General Packet Radio Service RLC/MAC Protocol Layer Deficiencies of General Packet Radio Service Medium Access Procedures In a General Packet Radio Service system, time slots can be shared between GSM circuit-switched voice and General Packet Radio Service packet-switched data services to achieve an overall capacity on demand system. Therefore General Packet Radio Service must have a high level of compatibility and interoperability with GSM. It must operate within the physical constraints imposed by the GSM cellular network as well as using the same physical layer transmission channels. Moreover, ease of maintenance and operations is very important for GSM operators, who prefer General Packet Radio Service procedures to closely mirror similar GSM procedures. This level of compatibility and interoperability extends to the use of GSM time slot, framing, random burst and normal burst structures in General Packet Radio Service. These constraints limit to a large extent the multiple access efficiency of General Packet Radio Service medium access procedures. It also places corresponding constraints on the type of enhancements that can be implemented to improve performance or provide larger variety of supported services.

The General Packet Radio Service system was designed primarily for providing only best effort service to bursty data traffic in a spectrally efficient manner. It is extremely well designed for providing this type of service and keeping the necessary level of compatibility and interoperability with GSM. However, 2.5G systems such as General Packet Radio Service are expected to eventually migrate in a graceful and cost-effective manner to full 3G network deployment. Therefore it is extremely desirable for enhancements of these systems to incorporate higher levels of 3G functionality. One of the main attributes of 3G is to enable new service applications. These new service applications are supported through the definition of supported 3G service classes with varying degrees of quality of service (QOS) requirements, including some with much more stringent delay requirements than the best effort service class. The ETSI UMTS Phase 2+ General Packet Radio Service recommendations include the following service classes:

Conversation Class—Preserves conversation pattern with stringent low delay and low error rate requirements. Example: voice service Streaming Class—Preserves time relation between information elements of the stream. Example: streaming audio, video Interactive Class—Preserves request response data transfer pattern and data payload content. Example: web browsing Background Class—Preserves data payload content and best effort service requirement. Example: Background download of email messages The conversational class has the most stringent low delay requirements followed by the streaming class and the interactive class. The background class is essentially delay-insensitive.

The present General Packet Radio Service system is best suited for the best of effort background service class with very loose delay requirements. Data transfer sessions are completely terminated (Temporary Back Flow terminated and Temporary Flow Identifier released) during idle periods in a bursty data stream. After an idle period ends with the arrival of additional data, the slow medium access procedure described above must be re-employed to establish data transfer. Although secure and reliable data transfer is achieved, other service classes with more stringent QOS delay requirements cannot be efficiently accommodated in the current General Packet Radio Service system. For example, consider the conversational class packet voice service. It is well known that voice activity detection combined with statistical multiplexing can significantly improve spectrum efficiency. Therefore it is desirable for a voice user to release the channel during a silent period and regain access only at the beginning of the next talk spurt. The unused residual capacity in these silent periods can be used to multiplex additional delay-insensitive services (e.g. best effort data) along with the voice users, thereby increasing the overall network spectral efficiency. The present General Packet Radio Service system cannot support this procedure since it would require a packet voice user to terminate its Temporary Back Flow and release its Temporary Flow Identifier during the silent period. Re-establishment of the data transfer connection (new Temporary Back Flow and Temporary Flow Identifier) using the current General Packet Radio Service slow medium access procedure will not satisfy voice traffic QOS latency requirements.

It is desirable to enhance the current General Packet Radio Service system to be able to support these additional stringent delay requirement service classes to arrive at a single IP-based integrated network capable of providing all services from conversational to best effort data. If all services are eventually moved to such a platform, lower operational costs can also be achieved. To be spectrally efficient for all of these service classes, it is necessary to be able to efficiently multiplex several data sessions with different QoS delay requirements on the same set of channels. A key requirement is to enhance the slow General Packet Radio Service medium access procedure to include fast in-session access capability. That is the objective of Quality Packet Radio Service.

Quality Packet Radio Service Fast In-Session Medium Access Procedures

In order to maximize spectral efficiency, all services in Quality Packet Radio Service are assigned uplink radio channel resources only when they have active data to send. For example, in a packet voice session, uplink channels are assigned only during talk spurts. In all services, the mobile subscriber station must release the uplink channel when its session is in an inactive state. For services with stringent low delay requirements, the mobile subscriber station can use the in-session network access procedures to request uplink channel resources when the session becomes active again with data to send. The objective of the Quality Packet Radio Service RLC/MAC protocol design is to support this in-session network access by providing the following capabilities:

Fast uplink access during an on-going session

Fast resource assignment for both uplinks and downlinks

These capabilities are provided using the following new set of control channels to efficiently implement the in-session access procedure.

Fast Packet Common Control Channels

Figure 8:
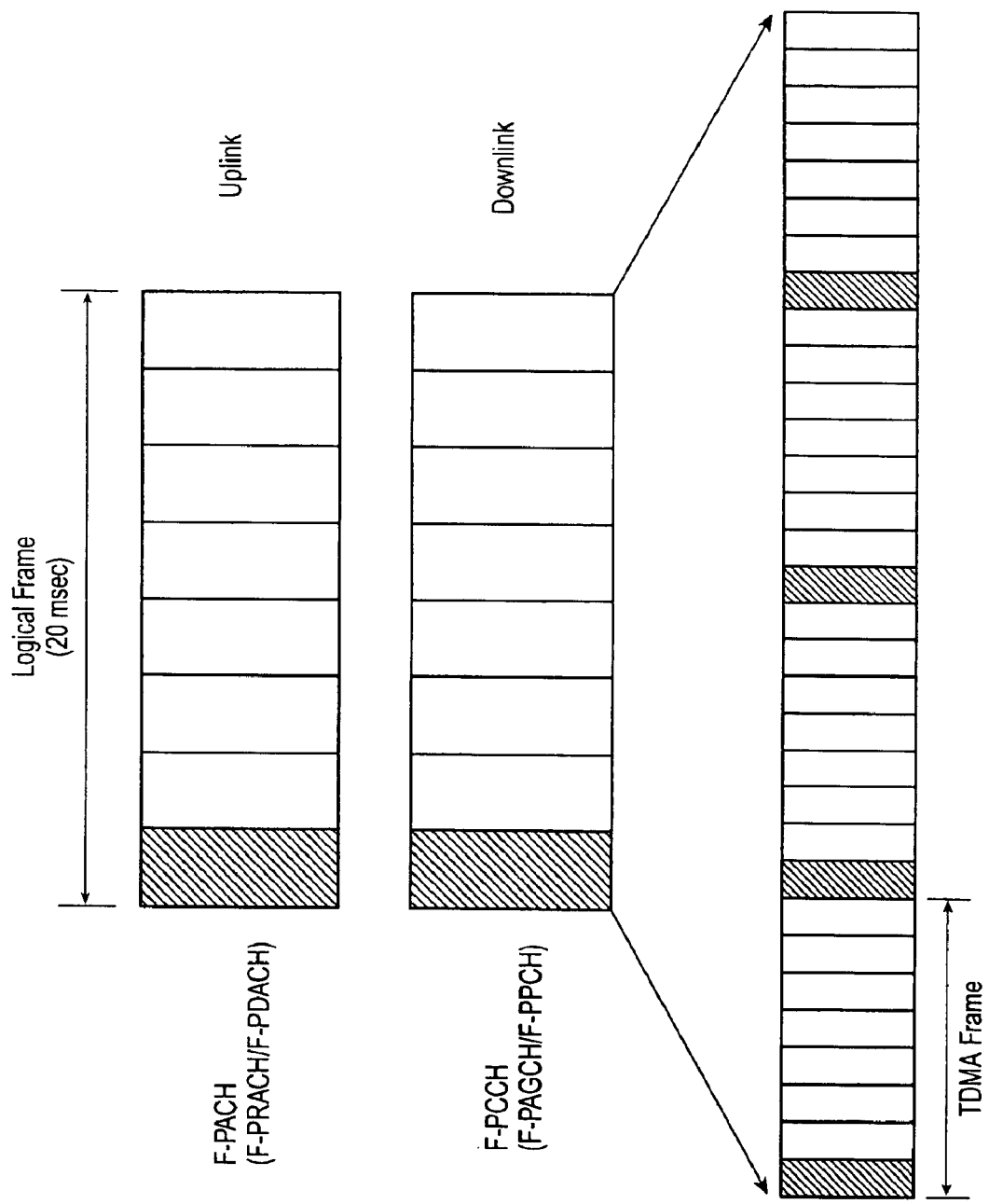
FIG. 8 illustrates the Quality Packet Radio Service fast uplink and downlink control channels.

A new set of common control channels, shown in FIG. 8, is designed to provide these in-session network access capabilities. These channels support similar access and control functions as the General Packet Radio Service common control channels (such as Packet Random Access Channel, Packet Access Grant Channel) except they are used solely in Quality Packet Radio Service to implement in-session access. These common control channels are structured to meet the stringent low delay requirements for in-session access and are termed "fast packet common control channels" herein. Since initial access between the mobile subscriber station and the cellular communication network has already been established, a smaller amount of overhead information is required for implementing in-session access, thereby allowing these stringent low delay requirements to be met. Specifically, for those services allowed to use in-session access, the assigned uplink channel resources are released during an in-session inactive data period by releasing its assigned Uplink State Flag(s) and Packet Data Traffic Channel(s). However the mobile subscriber station is allowed to maintain its uplink Temporary Flow Identifier. Thus, the mobile subscriber station can inform the Base Station Subsystem of its identity and the specific Temporary Back Flow being referenced by including the Temporary Flow Identifier in its in-session channel request message to very quickly identify the mobile subscriber station and the session referenced, enabling the Base Station Subsystem to assign necessary uplink resources.

Specifically, the following fast packet common control channels are implemented in Quality Packet Radio Service:

Unlink Fast Packet Access Channel (F-PACH)—used either as a Fast Packet Random Access Channel (F-PRACH) or as a Fast Packet Dedicated Access Channel (F-PDACH).

Downlink Fast Packet Control Channel (F-PCCH)—used as a Fast Packet Access Grant Channel (F-PAGCH) or as a Fast Packet Polling Channel (F-PPCH).

In a Quality Packet Radio Service system, these channels can be located on specific TDMA time slots of some selected carrier frequencies. FIG. 8 illustrates the structure of these channels implemented in the first time slot of every TDMA frame. Each uplink Fast Packet Access Channel has a corresponding downlink Fast Packet Control Channel paired with it.

Fast Packet Access Channel

The structure of the Fast Packet Access Channel is similar to that of the Packet Random Access Channel in General Packet Radio Service. Messages are transmitted in individual bursts and are not interleaved across bursts over several TDMA frames. The difference between the two is that Fast Packet Access Channel is used only for in-session access and never for initial network access. The Fast Packet Random Access Channel (F-PRACH) and Fast Packet Dedicated Access Channel (F-PDACH) can be time multiplexed on the same physical channel as determined by the traffic requirements in each cell site. Specific properties of these channels are as follows:

1. The Fast Packet Random Access Channel (F-PRACH) is used with the Replication Aloha random access protocol described below for contention resolution. The information in the message sent over the Fast Packet Random Access Channel includes the Temporary Flow Identifier and other identifying information of the requesting service. For a given Temporary Flow Identifier, the Base Station Subsystem already has the information necessary to determine its requirements such as the resources needed and the assignment priority to make a traffic data channel assignment.

2. The Fast Packet Dedicated Access Channel (F-PDACH) is used for fast dedicated access that is contention-free. It is therefore useful and reserved for future defined services that do not permit any QoS delay variability, for example:

a. Downlink channel condition measurements—allowing the Base Station Subsystem to assign a larger number of downlink time slots to higher quality channels, thereby increasing system throughputs through dynamic bandwidth assignment.

b. In future EDGE systems, dynamic data rate assignment can also be implemented by allowing higher order PSK modulation for higher quality channel conditions, thereby increasing the availability of peak data rates.

c. Pilot tracking signal for implementing smart antennas for increasing system throughputs.

d. Timing information to retain synchronization during in-session inactive data periods.

Fast Packet Control Channel

The Fast Packet Control Channel serves two major functions: to send access grant messages to a mobile subscriber station requesting in-session network access and to send polling messages to specific mobile subscriber stations. The Fast Packet Access Grant Channel (F-PAGCH) and Fast Packet Polling Channel (F-PPCH) can be time multiplexed on the same physical channel as determined by the traffic requirements in each cell site. Specific properties of these channels are as follows:

The Fast Packet Access Grant Channel is used to transmit channel assignment messages responding to access requests received over the paired Fast Packet Access Channel. The assignment message specifies the time slot number, Uplink State Flag(s) and Packet Data Traffic Channel(s) and other parameters such as the access probability parameters for the Replication Aloha random access procedure described below.

The Fast Packet Polling Channel is used to poll different mobiles for access queries and measurement reports as required.

In-session Fast Access RLC/MAC Protocol

Figure 10:
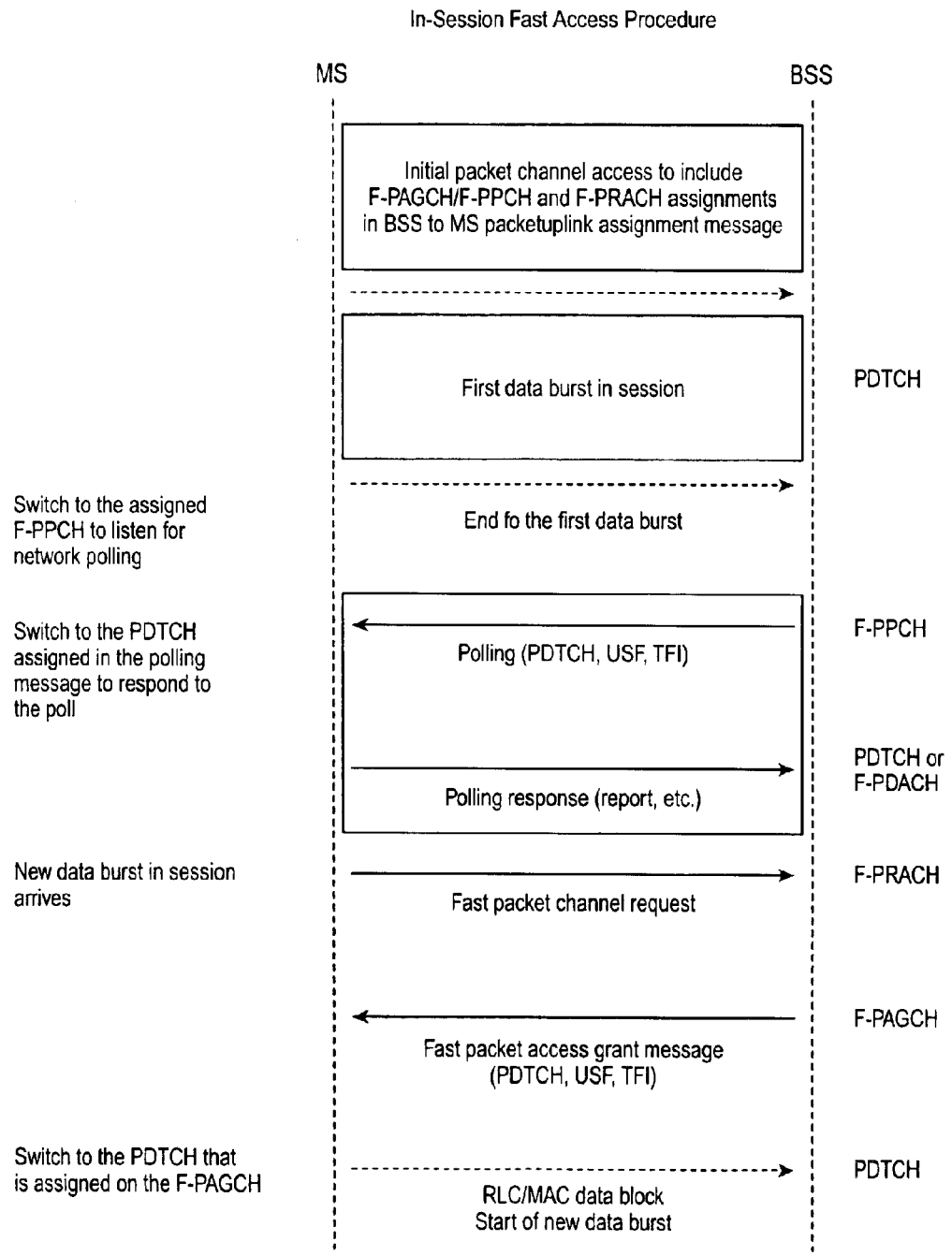
FIG. 10 illustrates the message flow for Quality Packet Radio Service fast in-session access procedure

The RLC/MAC protocols used for in-session uplink access in Quality Packet Radio Service make use of the Fast Packet Control Channels described above, as shown in FIG. 10. The following assumptions are made to obtain one version of the RLC/MAC protocol that provides in-session access meeting all the QOS delay requirements of the supported service classes:

1. The four service classes defined in the ETSI UMTS Phase 2+ General Packet Radio Service recommendations will be supported: conversational, streaming, interactive and background services.

2. All services are assigned radio channel resources only when they have active data to send. The mobile subscriber station must release the uplink radio resource during its session when it is in an inactive state.

3. Only the Fast Packet Random Access Channel control channel is used for initiating the fast in-session access. The channel assignment is sent by the Base Station Subsystem to the mobile subscriber station using the Fast Packet Access Grant Channel control channel paired to the Fast Packet Random Access Channel. The Fast Packet Dedicated Access Channel control channel is used only for transmission of low bit rate measurement data from the mobile subscriber station to the Base Station Subsystem.

Figure 9:
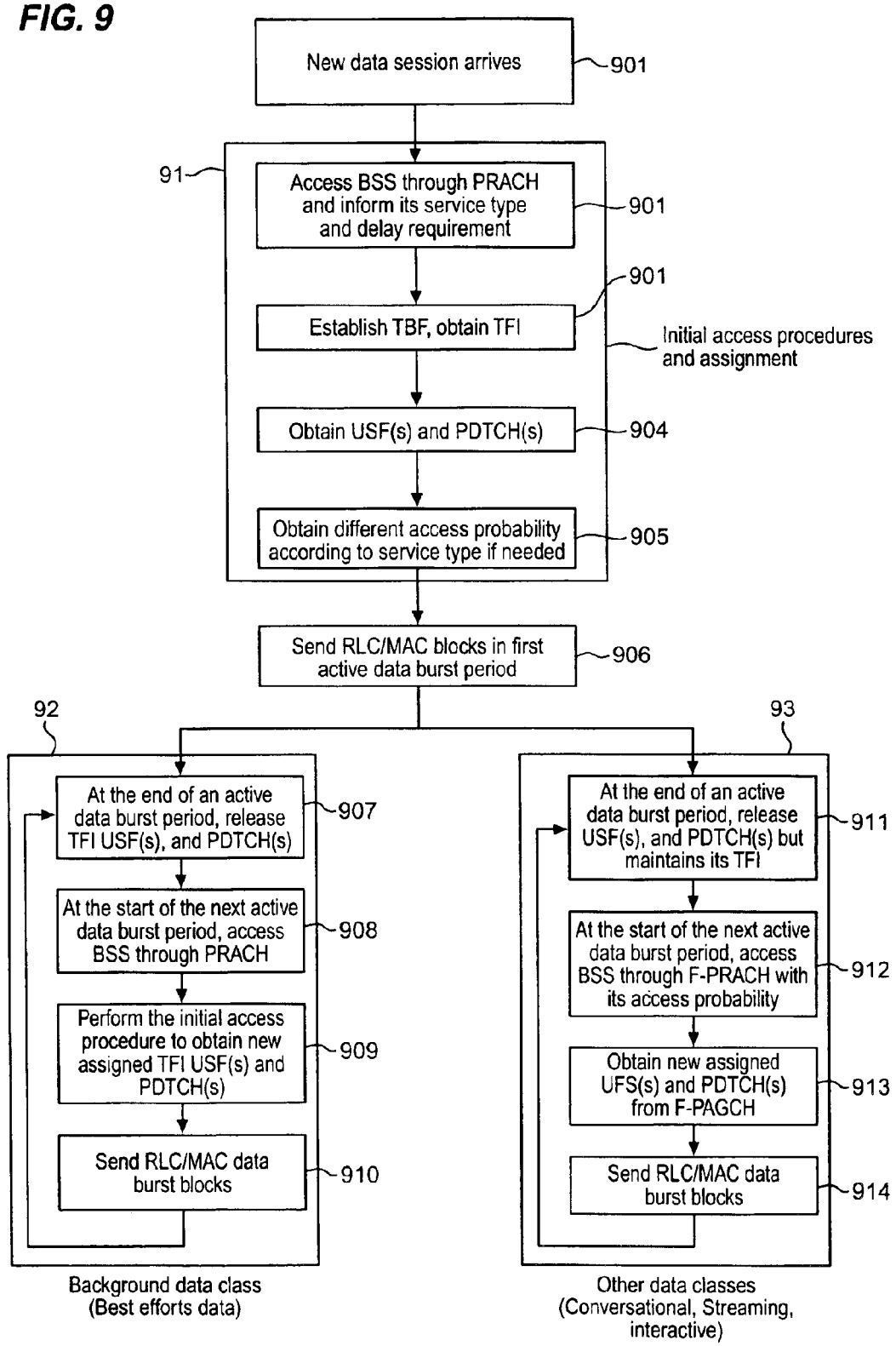
FIG. 9 illustrates the Quality Packet Radio Service uplink access procedures for different traffic classes

The overall access procedure is given in FIG. 9:

At the start of a new data session at step 901, the mobile subscriber station uses the normal General Packet Radio Service initial access procedure 91 (either one-phase or two-phase) starting the process by sending a packet channel request message over a Packet Random Access Channel at step 902. During this initial access procedure and channel resource assignment by the Base Station Subsystem, the mobile subscriber station establishes a Temporary Back Flow and obtains a Temporary Flow Identifier at step 903 and Uplink State Flags and Packet Data Traffic Channel(s) at step 904. An open-ended Temporary Back Flow is established for the conversational, streaming and interactive service classes while only a closed-ended Temporary Back Flow is allowed for the background service class. Moreover, for the purposes of differentiating the in-session random access contention resolution priorities for the conversational, streaming and interactive service classes, class specific access probabilities are assigned for the Replication Aloha random access procedure in step 905, as described below.

During Radio Link Control block data transfer from the mobile subscriber station to the Base Station Subsystem at step 906, the Radio Link Control layer enables link-level retransmission for the background (process 92), interactive and streaming service data (process 93). Link-level retransmissions are disabled for the conversational service data in order to minimize transmission delays for this service class.

At the end of each active data burst period during the session (with no data available for transmission until the next active data burst period):

a. For the background service, the mobile subscriber station releases its Temporary Flow Identifier, Uplink State Flag(s) and Packet Data Traffic Channel(s) at step 907.

b. For the conversational, streaming and interactive service classes, the mobile subscriber station maintains its Temporary Flow Identifier but releases its Uplink State Flag(s) and Packet Data Traffic Channel(s) at step 911.

At the start of the next active data burst period in the session:

a. For the background service class, the mobile subscriber station goes through the entire General Packet Radio Service initial access procedure (starting by sending a channel request message over a Packet Random Access Channel at step 908) to obtain a new uplink channel assignment: Temporary Flow Identifier, Uplink State Flag(s) and Packet Data Traffic Channel(s) at step 909.

b. For the conversational, streaming and interactive service classes, The mobile subscriber station starts a fast in-session access procedure by sending a packet channel request message containing its Temporary Flow Identifier to the Base Station Subsystem using a Fast Packet Random Access Channel control channel along with its service class assigned access probability parameters in the Replication Aloha random access procedure at step 912. The mobile subscriber station obtains new Uplink State Flag(s) and Packet Data Traffic Channel(s) assignments from the Base Station Subsystem at step 913 through an assignment message received over a Fast Packet Access Grant Channel control channel paired with the Fast Packet Random Access Channel.

The Base Station Subsystem can request the mobile subscriber station to send information like measurement reports by sending these requests over the fast polling channel Fast Packet Polling Channel. Responses can be sent back by the mobile subscriber station to the Base Station Subsystem over assigned Packet Data Traffic Channel(s) or assigned Fast Packet Dedicated Access Channel(s) at steps 910, 914, respectively.

Replication Aloha Random Access Protocol

Figure 11:
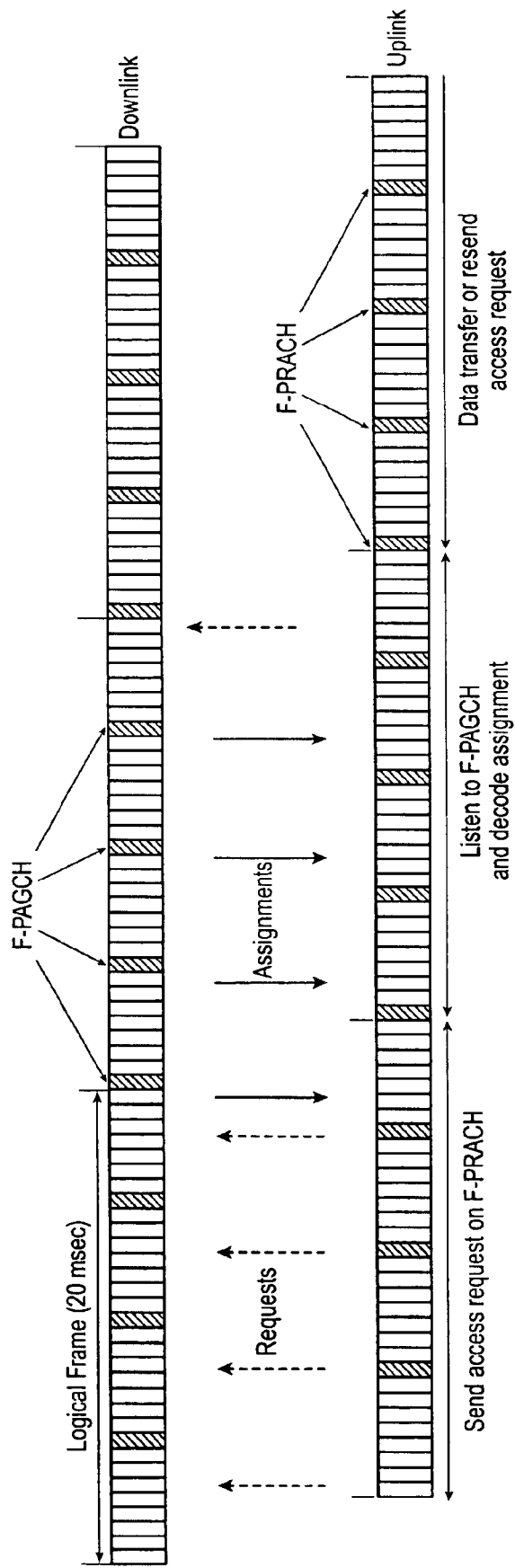
FIG. 11 illustrates the Quality Packet Radio Service generic access and assignment cycles

A generic access and acknowledgement cycle of the in-session procedure is shown in FIG. 11. Each fast uplink access request over an uplink Fast Packet Random Access Channel control channel occupies one TDMA time slot. The downlink Fast Packet Access Grant Channel assignment channels paired with each of the Fast Packet Random Access Channel channels in a given logical frame are multiplexed in the next downlink logical frame. So a complete access and assignment cycle occupies two logical frames or 40 msec duration. If contention is successful in the first access channel request, the minimum delay incurred to complete the in-session access procedure is 40 msec. Each cycle with unsuccessful contention increases this delay by 40 msec. It follows that for very fast access, higher contention success probabilities are desired, in particular for the service classes with more stringent low delay requirements. In order to improve the contention success probability for random access over the Fast Packet Random Access Channel control channels, a Replication Aloha protocol is proposed. This protocol operates in the following manner:

1. Each time a mobile subscriber station has a packet channel request message ready to initiate an in-session access, it randomly chooses k out of n consecutive Fast Packet Random Access Channel time slots and sends the same request message burst over each of these k time slots. Here k/n is the service class specific access probability assigned by the Base Station Subsystem to the mobile subscriber station in the initial access session access procedure which was previously described.
2. After sending this channel request, the mobile subscriber station listens to an uplink assignment message from the Base Station Subsystem on the Fast Packet Access Grant Channel control channels paired with the k Fast Packet Random Access Channel channels it used to send the channel request.
3. Upon receiving an access request message correctly, the Base Station Subsystem ignores any duplicate requests from the same mobile subscriber station. The Base Station Subsystem sends the uplink assignment message to the mobile subscriber station on the Fast Packet Access Grant Channel paired to the first Fast Packet Random Access Channel control channel over which the access request message was correctly received.
4. If none of the k request message transmissions from the mobile subscriber station are successfully received (that is, the mobile subscriber station does not receive any assignment messages in the expected Fast Packet Access Grant Channel time slots), it repeats Step 1 again. Step 1 is allowed to be repeated for only a maximum of K times before the access attempt is aborted.

The access probability parameters (k,n) can be chosen to satisfy access delay requirements for the different QoS service classes. An example of a possible choice of these parameters may be:

| | |
|---|---|
| 1. Conversational class | (k, n) = (2, 8) |
| 2. Streaming class | (k, n) = (1, 8) |
| 3. Interactive class | (k, n) = (1, 16) |

Figure 12:
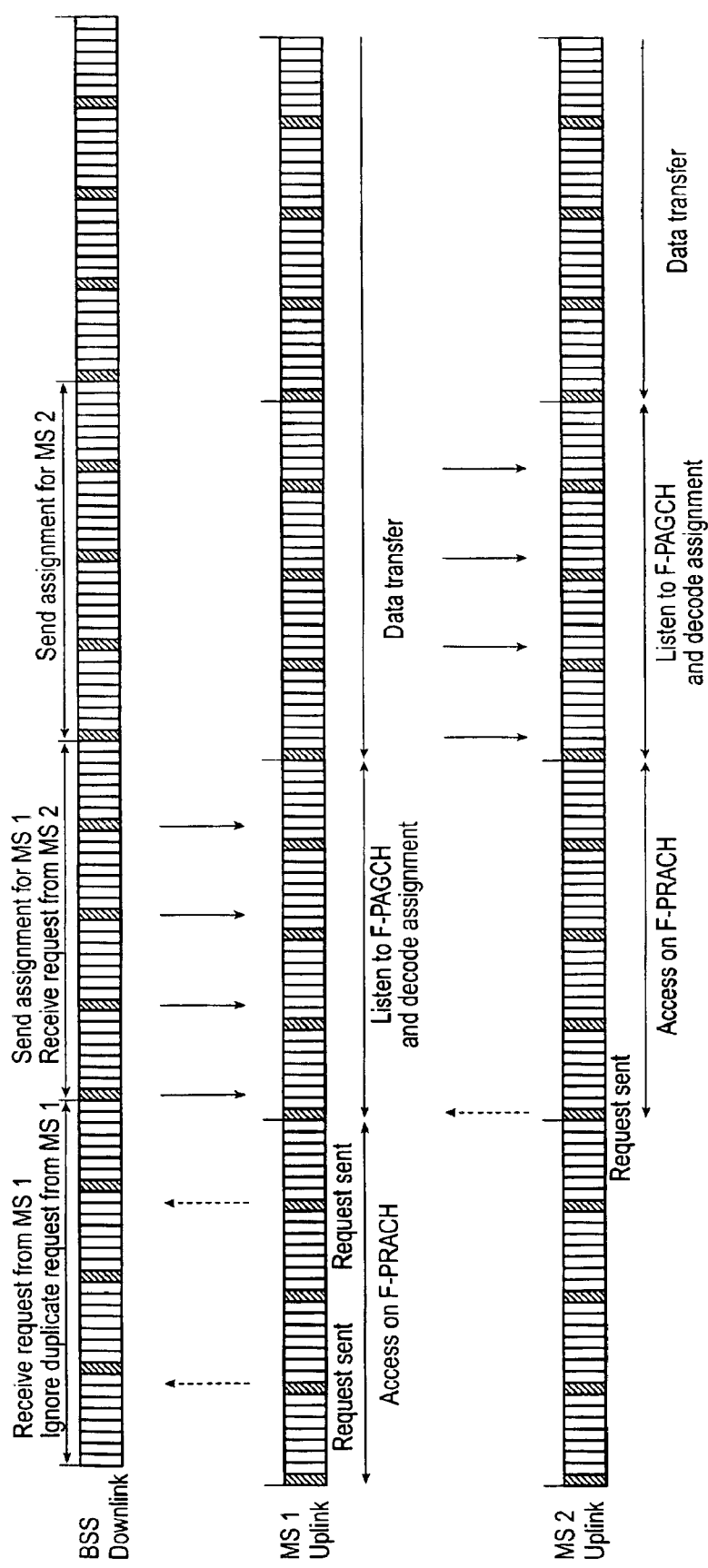
FIG. 12 illustrates the Quality Packet Radio Service replication Aloha random access

That is, a conversational service class in-session access attempt randomly chooses 2 access bursts over the next two logical frames while the interactive service class in-session access attempt randomly chooses 1 access burst over the next 4 logical frames. FIG. 12 illustrates the Replication Aloha access and assignment cycle where mobile subscriber station 1 uses access probability parameters (2,4) and mobile subscriber station 2 uses access probability parameters (1,4).

Access Delay Performance Analysis

Replication Aloha is designed to have an access delay advantage over the standard Aloha random access contention resolution protocol. Certainly the contention success probability in the absence of any radio transmission errors is increased by sending multiple copies of the request message. It should also be noted that the hostile mobile radio transmission environment could cause a significant rate of transmission errors, thereby requiring re-transmissions of incorrectly received channel request messages caused by these errors. Replication Aloha has the ability to mitigate these effects as well. Our mathematical analysis shows that the average access delay performance for a k=2 Replication Aloha protocol was 20 to 40 percent lower than the corresponding average delay for the standard Aloha protocol. This analysis also suggested that using more than k=2 transmitted copies in Replication Aloha did not yield significant additional performance gains. That is because a larger number of transmission copies increased the amount of contention traffic, thereby canceling the advantage obtained by the redundant transmissions. So it appears that k=2 Replication Aloha random access should be employed in Quality Packet Radio Service to accommodate the more stringent low QoS latency services.

Summary

The Quality Packet Radio Service enhances the slow General Packet Radio Service medium access procedure to include fast in-session access capability. All services in Quality Packet Radio Service are assigned uplink radio channel resources only when they have active data to send and a new set of common control channels is designed to provide these in-session network access capabilities. These channels support similar access and control functions as the General Packet Radio Service common control channels (such as Packet Random Access Channel, Packet Access Grant Channel) except they are used solely in Quality Packet Radio Service to implement in-session access.

What is claimed:

1. A method for providing low-delay network access to mobile subscriber stations operable in a cellular communication network that provides packet-switched data communications, comprising:

assigning, in response to a service request received from a mobile subscriber station, a radio channel having an uplink channel and a downlink channel to serve said mobile subscriber station; and assigning, in response to a service request received from a mobile subscriber station indicative of active data to be exchanged with said mobile subscriber station, radio channel resources on said assigned radio channel to said mobile subscriber station, comprising:

transmitting, via a fast packet access channel, multiple copies of access request messages from said mobile subscriber station to said cellular communication network; and transmitting, via a fast packet control channel, access grant messages to a mobile subscriber station requesting in-session network access.

2. The method of claim 1 wherein said assigned radio channel has an uplink channel and a downlink channel, said step of assigning radio channel resources comprises:

releasing, in response to a communication session executing in said mobile subscriber station entering an inactive state, said uplink channel.

3. The method of claim 2 wherein said step of releasing radio channel resources comprises:

releasing assigned uplink channel Uplink State Flag(s) and Packet Data Traffic Channel(s).

4. The method of claim 3 wherein said step of releasing radio channel resources further comprises:
   maintaining the mobile subscriber station uplink Temporary Flow Identifier.

5. The method of claim 2 wherein said step of assigning radio channel resources further comprises:
   reassigning, in response to said communication session becomes active again with data to send, radio channel resources on said assigned radio channel to said mobile subscriber station.

6. The method of claim 5 wherein:
   said step of assigning a radio channel comprises:
   implementing a virtual connection that supports unidirectional transfer of Logical Link Control Packet Data Units on packet data physical channels between said mobile subscriber station and a Base Station Subsystem in said cellular communication network,
   maintaining a Temporary Flow Identifier indicative of the active state of said virtual connection; and
   said step of assigning radio channel resources further comprises:
   maintaining at least one Uplink State Flag indicative an identity of a specific data transfer executing in said communication session.

7. The system of claim 6 wherein said mobile subscriber station transmits data indicative of its identity and the specific virtual connection being referenced by including said Temporary Flow Identifier in its in-session channel request message, said step of assigning radio channel resources enables said Base Station Subsystem to assign uplink resources to serve said virtual connection.

8. The system of claim 1 wherein said step of assigning radio channel resources further comprises:
   transmitting, via a fast packet control channel, polling messages to a mobile subscriber station.

9. The system of claim 1 wherein said step of transmitting via a fast packet access channel transmits said messages in individual bursts in a single data frame.

10. The system of claim 1 wherein said step of transmitting via a fast packet control channel transmits said messages in individual bursts in a single data frame.

11. The system of claim 1 wherein said step of assigning radio channel resources multiplexes multiple data streams with different QoS latency requirements over multiple data traffic channels.

12. The system of claim 1 wherein said step of transmitting via a fast packet control channel transmits control channel measurements and timing measurements to said cellular communication network, said method further comprising:
   performing at least one of the channel management functions of: dynamically assigning traffic time slots according to channel quality conditions to increase General Packet Radio Service network throughput through dynamic bandwidth assignment, dynamically changing the peak transmission rate according to channel quality conditions for mobile data networks that employ a set of different multilevel modulation schemes, transmitting timing information during inactive periods of a traffic session.

13. The system of claim 1 wherein said step of assigning radio channel resources transmits multiple copies of a message to reduce average delays caused by both traffic contention and mobile radio channel fading degradations.

14. A system for providing low-delay network access to mobile subscriber stations operable in a cellular communication network that provides packet-switched data communications, comprising:
   channel assignment means, responsive to a service request received from a mobile subscriber station, for assigning a radio channel having an uplink channel and a downlink channel to serve said mobile subscriber station; and
   fast packet channel assignment means, responsive to a service request received from a mobile subscriber station indicative of active data to be exchanged with said mobile subscriber station, for assigning radio channel resources on said assigned radio channel to said mobile subscriber station, comprising:
      access request transmitting means for transmitting, via a last packet access channel, multiple copies of access request messages from said mobile subscriber station cellular communication network; and
      access grant transmitting means for transmitting, via a fast packet control channel, access grant messages to a mobile subscriber station requesting in-session network access.

15. The system of claim 14 wherein said assigned radio channel has an uplink channel and a downlink channel, said fast packet channel assignment means comprises:
   channel release means, responsive to a communication session executing in said mobile subscriber station entering an inactive state, for releasing said uplink channel.

16. The system of claim 15 wherein said channel release means comprises:
   means for releasing assigned uplink channel Uplink State Flag(s) and Packet Data Traffic Channel(s).

17. The method of claim 16 wherein said channel release means further comprises:
   means for maintaining the mobile subscriber station uplink Temporary Flow Identifier.

18. The system of claim 15 wherein said fast packet channel assignment means further comprises:
   channel reassignment means, responsive to said communication session becomes active again with data to send, for assigning radio channel resources on said assigned radio channel to said mobile subscriber station.

19. The system of claim 18 wherein:
   said channel assignment means comprises:
   temporary flow identifier means for implementing a virtual connection that supports unidirectional transfer of Logical Link Control Packet Data Units on packet data physical channels between said mobile subscriber station and a Base Station Subsystem in said cellular communication network,
   data flow management means for maintaining a Temporary Flow Identifier indicative of the active state of said virtual connection; and
   said fast packet access channel means further comprises:
   means for maintaining at least one Uplink State Flag indicative an identity of a specific data transfer executing in said communication session.

20. The system of claim 19 wherein said mobile subscriber station transmits data to said fast packet channel assignment means indicative of its identity and the specific virtual connection being referenced by including said Temporary Flow Identifier in its In-session channel request message, said fast packet access channel assignment means enables said Base Station Subsystem to assign uplink resources to serve said virtual connection.

21. The system of claim 14 wherein said fast packet channel assignment means further comprises:

fast packet control channel means for transmitting polling messages to a mobile subscriber station.

22. The system of claim 14 wherein said fast packet access channel means transmits said messages in individual bursts in a single data frame.

23. The system of claim 14 wherein said fast packet control channel means transmits said messages in individual bursts in a single data frame.

24. The system of claim 14 wherein said fast packet channel assignment means multiplexes multiple data streams with different QoS latency requirements over multiple data traffic channels.

25. The system of claim 14 wherein said fast packet control channel means transmits control channel measurements and timing measurements to said cellular communication network to enable said cellular communication network further comprising:

means for performing at least one of the channel management functions of: dynamically assigning traffic time slots according to channel quality conditions to increase General Packet Radio Service network throughput through dynamic bandwidth assignment, dynamically changing the peak transmission rate according to channel quality conditions for mobile data networks that employ a set of different multilevel modulation schemes, transmitting timing information.

26. The system of claim 14 wherein said fast packet channel assignment means transmits multiple copies of a message to reduce average delays caused by both traffic contention and mobile radio channel fading degradations.

* * * * *